United States Patent
Wu et al.

(10) Patent No.: US 6,965,735 B2
(45) Date of Patent: Nov. 15, 2005

(54) METHOD AND APPARATUS FOR SWITCHING AUTOMATICALLY AND SYNCHRONOUSLY AMONG OPTICAL CHANNELS

(75) Inventors: Ting-Feng Wu, Kaohsiung Hsien (TW); Hsuan-Hung Wu, Kaohsiung (TW); Wen-Pin Yang, Kaohsiung (TW); Teng-Yuan Chi, Kaohsiung (TW)

(73) Assignee: Technology Thesaurus Corp., Kaohsiung (TW)

( * ) Notice: Subject to any disclaimer, the term of this patent is extended or adjusted under 35 U.S.C. 154(b) by 681 days.

(21) Appl. No.: 09/986,243

(22) Filed: Nov. 8, 2001

(65) Prior Publication Data

US 2003/0035175 A1    Feb. 20, 2003

(30) Foreign Application Priority Data

Aug. 14, 2001    (TW) ................................ 90119894 A

(51) Int. Cl.⁷ ...................... H04B 10/08; H04B 17/00; H04B 10/00
(52) U.S. Cl. .................... 398/12; 398/19; 398/111; 398/33; 398/5; 398/17
(58) Field of Search ........................ 398/12, 19, 111, 398/33, 5, 17

(56) References Cited

U.S. PATENT DOCUMENTS

| | | | |
|---|---|---|---|
| 5,710,846 A * | 1/1998 | Wayman et al. | 385/17 |
| 6,243,510 B1 * | 6/2001 | Rauch | 385/15 |
| 6,421,149 B2 * | 7/2002 | Tervonen et al. | 398/9 |
| 6,528,777 B2 * | 3/2003 | Ames et al. | 250/214 R |

* cited by examiner

Primary Examiner—M. R. Sedighian
Assistant Examiner—Quan-Zhen Wang
(74) Attorney, Agent, or Firm—Rosenberg, Klein & Lee

(57) ABSTRACT

A method and an apparatus for switching channel connection between multiple optical channels synchronously and automatically. The apparatus employs an optical switch to interface among a plurality of optical channels, and an optical power meter to monitor data transmission over the plurality of optical channels by measuring the optical power level of optical signals over the channel. When signal transmission is detected over a specific optical channel, the optical switch is locked to the specific optical channel allowing data signals over the specific optical channel to be transmitted to a specific device or another optical channel through the optical switch. When no optical signal is detected over the channel, said optical switch will be switched to another optical channel, such that signal monitoring and switching channels among a plurality of optical channels is able to be performed synchronously and automatically.

4 Claims, 11 Drawing Sheets

METHOD AND APPARATUS FOR SWITCHING AUTOMATICALLY AND SYNCHRONOUSLY AMONG OPTICAL CHANNELS

BACKGROUND OF THE INVENTION

1. Field of the Invention

The present invention relates to a method for switching optical channels automatically and synchronously and an apparatus for the same, and more particularly to a technique of scanning for optical signals over a plurality of optical channels so as to automatically and synchronously switch connection among optical terminals and optical channels.

2. Description of Related Art

At the present, wired transmission has been widely used as a medium for data transmission and reception over the Internet. The latest communication media, fiber optic, with the advantages of broadband communication at high speed is becoming increasingly popular on the communication market.

Most communication and electronics suppliers and even building constructors are aware of the tremendous business opportunities behind the development of fiber optic related products, and building constructors even reserve certain space for laying fiber optic lines and connection terminals in the blueprint stage. This phenomenon further confirms the importance and future potential of this type of communication medium. However in view of the relatively high costs of fiber optic materials and fiber optic network set-up costs, only big enterprises and communication operators can afford to set up fiber optic network on their trunk lines so as to satisfy the high volume of data communication.

At present, since fiber optic communication networks are already in operation it needs an appropriate level of repair and maintenance to support the new communication medium. Disclosed is the current practice in handling signal transmission bottlenecks among the trunk lines, to be studied in conjunction with the related circuit layout and equipment set up diagrams in FIG. 7.

Normally, there will be a dedicated spare optical channel TX2/RX2 for preventing breakdown in data transmission if the main channel TX1/RX1 is damaged, and the main channel TX1/RX1 and the spare channel TX2/RX2 are equipped with two optical switches (60) (60a) at two ends. When breakdown in data transmission is detected over the main channel TX1/RX1, operators at both ends of the main channel TX1/RX1 will be notified immediately by phone and asked to switch over the optical switch (60) (60a) to the spare channel TX2/RX2 for resuming the data communication. Usually this is a time-consuming handling procedure that has to be executed manually.

Besides the handling procedure mentioned above, it is feasible to use a control system to control the two optical switches (60)(60a) via a communication line (71). When the master channel TX1/RX1 breaks down, and the control system (70) has acknowledged the breakdown, control signals will be sent over the communication line (71) to both optical switches (60)(60a) causing them to switch over to the spare channel TX2/RX2 simultaneously. Although control of the optical switches (60)(60a) by the control system (71) is capable of overcoming the problem of manual operation, the following disadvantages still remain:

1. An extra controller system needs to be further provided.
2. An extra communication line needs to be set up, and furthermore, it is difficult to set up the communication line, since the distance between the optical switches is usually over 100 km, no matter whether cable, wireless or microwave means are used.

From the handling procedures described above, it is difficult for manual-operated switches to attain high efficiency in the process of channel switching, and it is necessary to dispatch personnel to perform the switchover, which involves extra labor costs and time-consuming. The automated line switchover set up between the main channel and the spare one is not without weakness either, since an additional communication line and a controller system involves considerable investment. Therefore, whether it is a manual handling procedure or an automated line switchover, there are some disadvantages that need to be overcome.

Therefore, the present invention provides a method and an apparatus for switching optical channels automatically and synchronously to mitigate and/or obviate the aforementioned problems.

SUMMARY OF THE INVENTION

The main object of the present invention is to provide an apparatus that is capable of detecting any communication breakdown on the optical channels, and switching the connection to a spare optical channel synchronously and automatically, employing a pair of optical switches, with no need of a controller system or an extra communication line, thus providing an efficient and fast means for switching over the data communication channel.

To achieve the main object mentioned above, the switching apparatus of the present invention includes at least a pair of optical switches with multiple ports, and an optical power meter connected to a common end of each optical switch, and a microprocessor for controlling the switchover among the multiple ports. Each of the multiple ports is linked to a respective optical channel, and said optical power meter is used for detecting any communication breakdown over the optical channels.

A secondary object of the present invention is to provide a means for automatic channel switching among a plurality of optical channels, wherein the common end of each of optical switches is connected to an optical receiver, and each optical channel is connected to an optical transmitter. Said switching apparatus is able to detect any signals transmitted from a specific optical transmitter, so that the optical switch will be locked to said transmitting optical channel until the data transmission is finished or any breakdown from said optical transmitter. When the data transmission over the channel is ended, the switching apparatus will automatically switch to an optical transmitter on another optical channel and lock in until the data communication is ended.

Other objects, advantages, and novel features of the invention will become more apparent from the following detailed description when taken in conjunction with the attached drawings.

DETAILED DESCRIPTION OF THE PREFERRED EMBODIMENT

Figure 1:
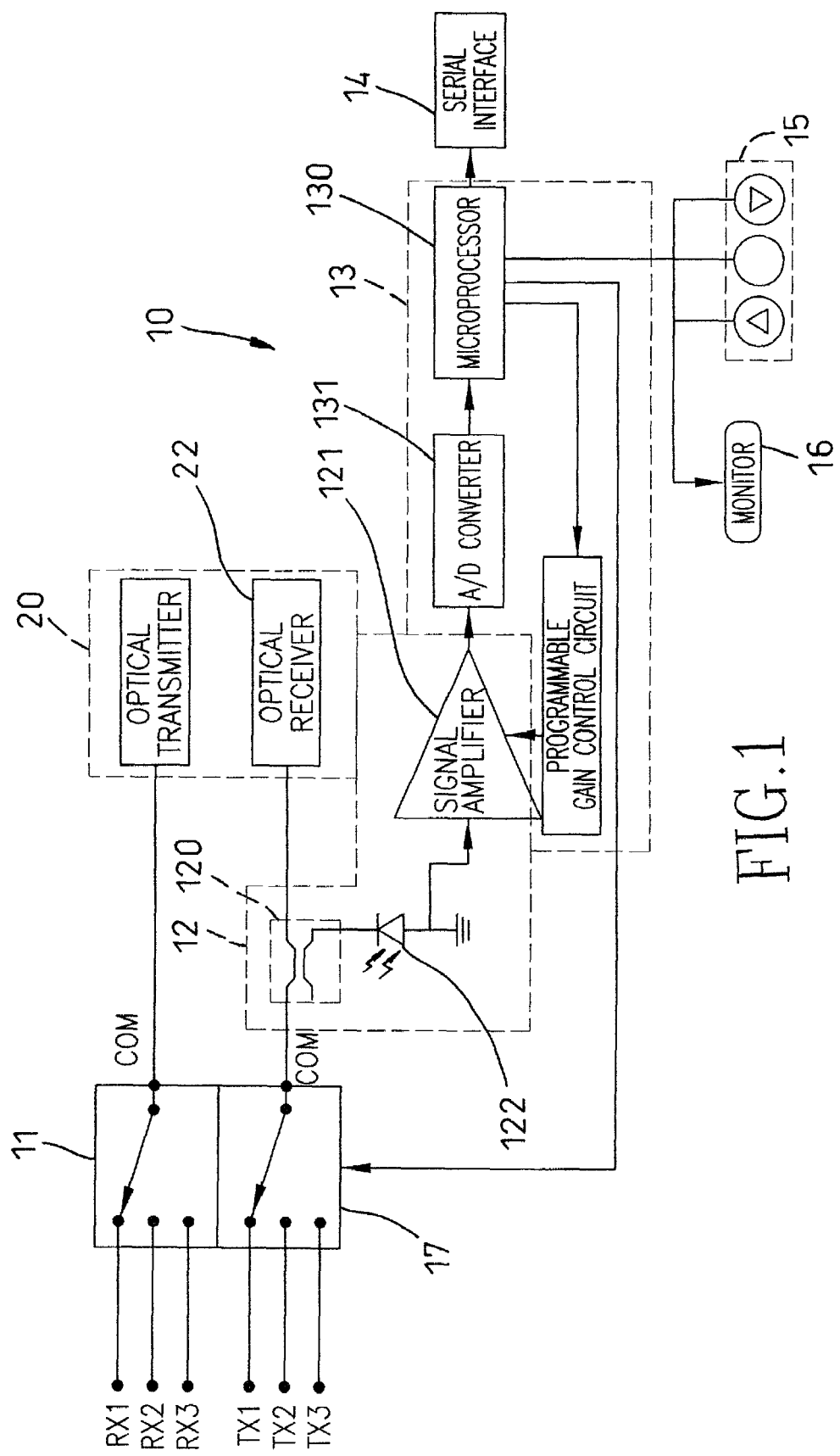
FIG. 1 is a block circuit diagram of the present invention.

With reference to FIG. 1, a block diagram of a switching device (10) in accordance with the present invention mainly includes at least a pair of optical switches (11)(17) (in the present embodiment an optical switch with three ports and a common end COM is used), an optical power meter (12), a switch-controlling circuit (13) and a serial interface (14).

The optical power meter (12) is formed with an optical splitter (120), a positive-intrinsic-negative (PIN) diode (122) connected to the optical splitter (120), and a signal amplifier (121) connected with the PIN diode (122).

The switch-controlling circuit (13) is formed with a microprocessor (130), an analog/digital (A/D) converter (131) connected between an output of the signal amplifier (121) and an input of the microprocessor (130), a monitor (16) and a keypad (15) connected to another input of the microprocessor (130), wherein the keypad (15) receives external control commands.

A small amount of a light signal is intercepted from optical channels (TX1–TX3) through the optical switch (17) by the optical splitter (120), and the remaining light signal is transmitted to an optical receiver (22) of an optical terminal (20). The small amount of light signal intercepted by the optical splitter (120) is further sent to the PIN diode (122) and amplified by the signal amplifier (121), then converted into digital signal by the A/D converter (131) and sent to the microprocessor (130), whereby the microprocessor (130) is able to detect which of the optical channels (TX1–TX3) is in optical transmission.

The serial interface (14), which is connected to the output of the microprocessor (130), is an interface for connecting with a computer (not shown) or electronic equipment, such as RS485.

The detailed circuit diagrams of the signal amplifier (121), the microprocessor (130), the A/D converter (131), the serial interface (14), the keypad and the monitor (16) are disclosed in FIGS. 6A–6E.

Figure 2:
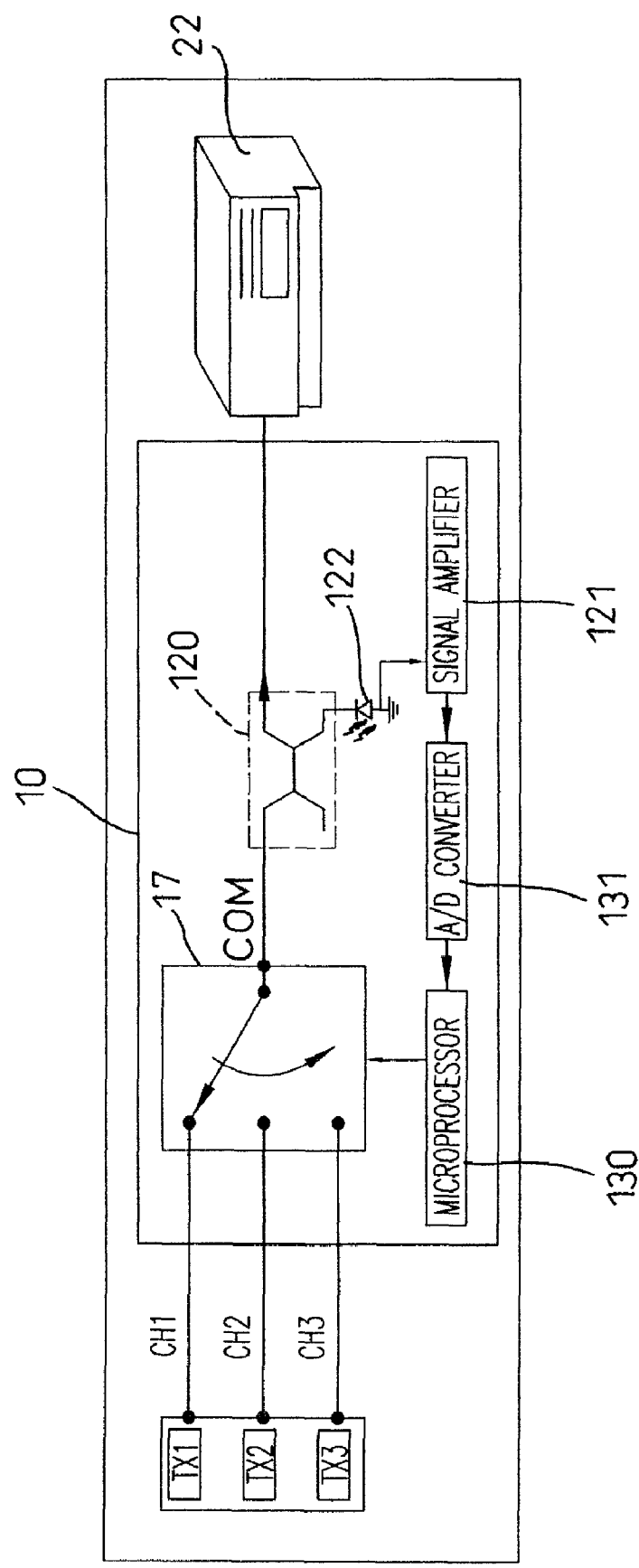
FIG. 2 is a diagrammatic view of the operation of the present invention.

With reference to FIG. 2, the switching device (10) of the present invention is applied to connect between a plurality of unidirectional optical channels TX1–TX3 and the optical receiver (22). The ports CH1, CH2 and CH3 on the optical switch (17) are respectively linked to the optical channels TX1, TX2 and TX3 while a common end COM is connected to the optical receiver (22).

When the optical switch (17) is switched to port one CH1, it allows TX1 and the optical receiver (22) to be connected for data transmission, and in the mean time, a small amount of an optical signal (for example 1%) will be tapped by the optical splitter (120) and passed to the PIN diode (122) for converting the tapped optical signal and the signal amplifier (121) for amplification. The amplified signal will be sent to the input of the microprocessor (130) through the A/D converter (131) for determining whether there is data traffic over the channel and causing the optical switch (17) to be locked to CH1 until the data transmission between TX1 and the optical receiver (22) is ended.

Upon completion of data transmission over channel TX1, optical signals will disappear from the channel TX1, so that PIN diode (122) is unable to intercept any optical signals from the optical splitter (120), and the lock applied on CH1 will be released by the microprocessor (130), and the optical switch (17) will be switched to CH2 and CH3 in turn for seeking new optical signals. If any optical signals are detected over the channels TX2, TX3, the optical switch (17) will again be locked to the port until the data transmission is completed. The process will repeat itself over and over again. Through this process, the switching device (10) is capable of detecting any optical signals and making a switch and locking in the optical channel (CH1–CH3) automatically.

Figure 3:
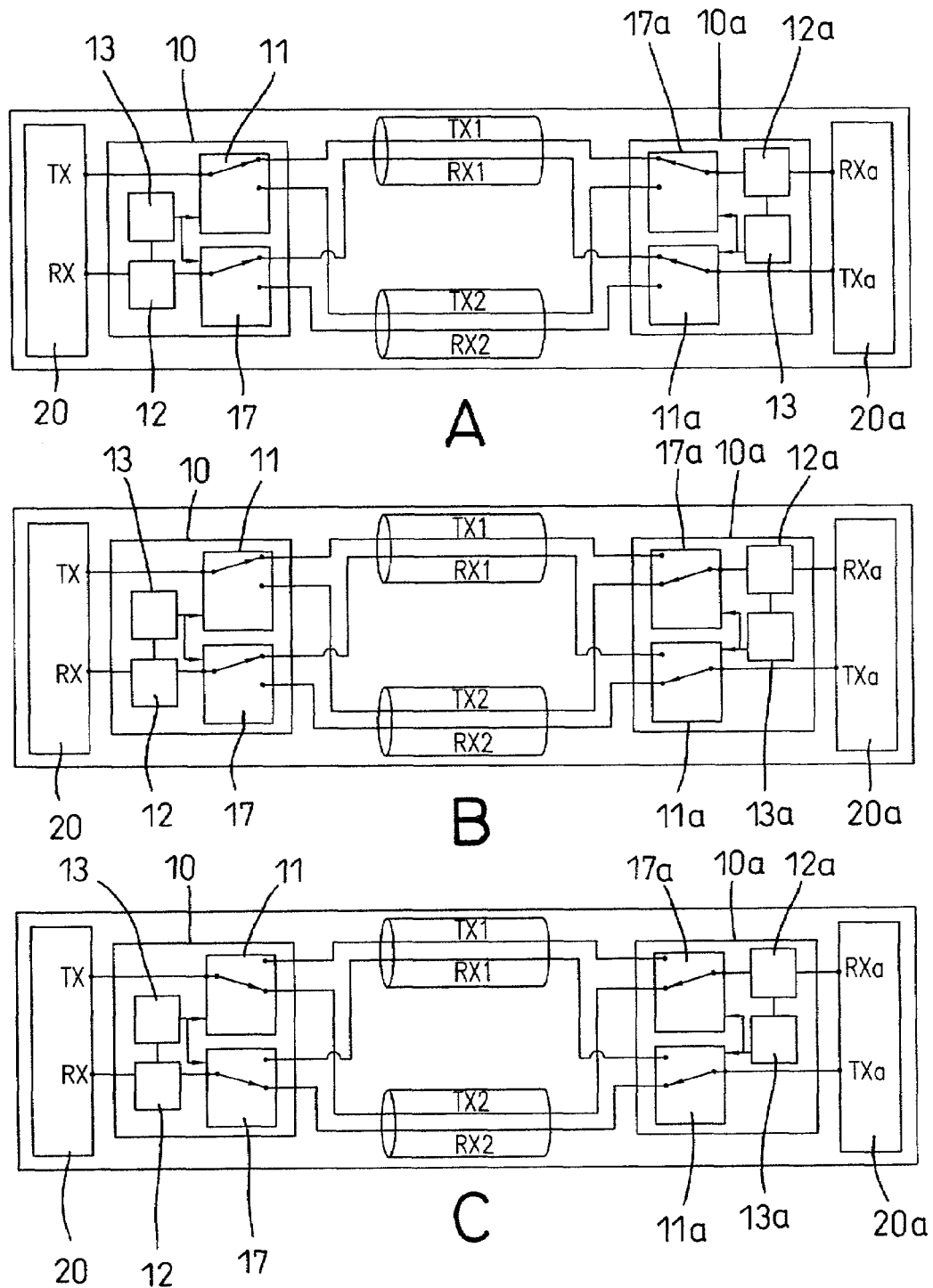
FIGS. 3A–3C are schematic views of the operation of the present invention.

FIGS. 3A, 3B and 3C depict diagrammatic views of the operation of another embodiment of the invention. In this embodiment, the switching devices (10, 10a) are used for switching between a main and a spare bi-directional optical channel automatically. The switching devices (10, 10a) are connected across the main and the spare of bi-directional optical channels, and each optical switch (11, 17, 11a, 17a) of the switching devices (10, 10a) is connected to each optical channel.

To provide further insight into the operation flow in the automatic switching between the main and spare optical channels, an example is used to illustrate different scenarios when the main and spare channels are damaged to varying degrees.

A pair of bi-directional channels are used in the present example, with the first one acting as the main optical channel and the second one as the spare optical channel, wherein the main optical channel includes a transmit path TX1 and a receive path RX1, and the spare optical includes a transmit path TX2 and a receive path RX2. The first and the second switching devices (10, 10a) are respectively installed across TX1/RX1, TX2/RX2 and a pair of optical terminals (20, 20a). Each switching device (10, 10a) uses a pair of optical switches (11, 17, 11a, 17a) to support the main and the spare optical channels. Three kinds of operation are described based on three different scenarios of channel damage.

FIG. 3A depicts the main channel path in a normal operating condition, where data transmission and reception are performed over the main optical channel TX1/RX1 through the action of the first and the second switching devices (10, 10a) that send and receive signals between the first and second optical terminals (20, 20a). The first and the second optical switches (11, 17, 11a, 17a) connected to both ends of the main channel TX1/RX1 will both be switched to the first port so that data transmission can be effected between the first optical terminal (20) and the second optical terminal (20a) through the main channel.

Scenario 1: As shown in FIG. 3B, if the transmit path TX1 on the main channel is damaged, so that the optical power meter (12a) on the second switching device (10a) is unable to detect any signal from the transmit terminal TX1 of the first optical terminal (20), the switch-controlling circuit (13a) in the second switching device (10a) will order the first and the second optical switches (17a)(11a) to step down to the second port. Thus TXa/RXa of the second optical terminal (20a) becomes connected to the spare channel TX2/RX2 for data transmission. While in the mean time, the optical switches (11)(17) of the first switching device (10) remain in the first port position, causing the communication at both ends of the optical terminals (20)(20a) to break down. The first switching device (10) is unable to detect the optical signal transmitted from TXa of the second optical terminal (20a).

Please refer to FIG. 3C for more details. The switch-controlling circuit (13) of the first switching device (10) will order the first and the second optical switches (11)(17) to step down to the second port simultaneously, so that the TX/RX terminal of the first optical terminal (20) will be switched to TX2/RX2 of the spare channel path. At this point, the transmit/receive connection across the first and second optical terminals (20)(20a) through the spare channel path has been established for data transmission across the first and the second optical terminals (20)(20a).

Scenario 2: If the receive channel RX1 on the main channel is damaged, so that the optical power meter (12) on the first switching device (10) is unable to detect any signal from the transmit terminal TXa of the second terminal (20a), the switch-controlling circuit (13) in the first switching device (10) will order the first and the second optical switches (11)(17) to step down to the second port. The connection between the paths TX1/RX1 and the first optical terminal (20) becomes disconnected. In the meantime, the second switching device (10a) is unable to detect any optical signal, therefore forcing the first and the second switches (11a)(17a) to step down to the second port. At this point, the first and the second optical terminals (20)(20a) are connected through the spare channel path TX2/RX2. The object of establishing successful communication connection using the spare channel path as a transmission media and switching optical channels automatically and synchronously has been realized.

Scenario 3: If both TX1/RX1 channels on the main channel path are damaged simultaneously, so that the first and the second switching devices (10)(10a) are unable to detect any optical signal power, the switch-controlling circuits (13)(13a) order the optical switches (11)(17)(11a)(17a) to step down to the second port, therefore TX/RX and TXa/RXa of the first and the second terminals (20)(20a) will be switched to TX2/RX2 on the spare channel. At this point, successful connection is established between a pair of switching devices (10)(10a) through the spare channel TX2/RX2 in common, and the spare channel path becomes the transmission medium between the first and the second optical terminals (20)(20a), hence automatic and synchronous switching to the spare channel is achieved.

Reviewing the three scenarios described foregoing, no controller system and no extra communication lines are needed in the present invention for completing the automatic and synchronous switching of the optical switches (11)(17) (11a)(17a) on both ends of the optical channels, and that successful connection still can be established by switching the transmit and receive ends of the first and second optical terminals (20)(20a) to the TX2/RX2 of the spare optical channel, no matter whether it is the transmit path TX1 or receive path RX1 of the main channel damaged or both are damaged.

The example described above is the preferred embodiment, but the present invention is by no means restricted to a pair of optical channels as the main and the spare. It is can be applied to communication networks with multiple sets of optical channels, as long as an N×1 optical switch is available as the interface.

It happens that the pair of optical switches (11, 17, 11a, 17a) of the first and the second switching devices (10, 10a) might out-run each other during the switching process, resulting in the pair of optical switches (11, 17, 11a, 17a) being engaged in different port positions. An explanation is offered here for this phenomenon using a 3×1 optical switch (an optical switch with 3 ports) as an example.

Figure 4:
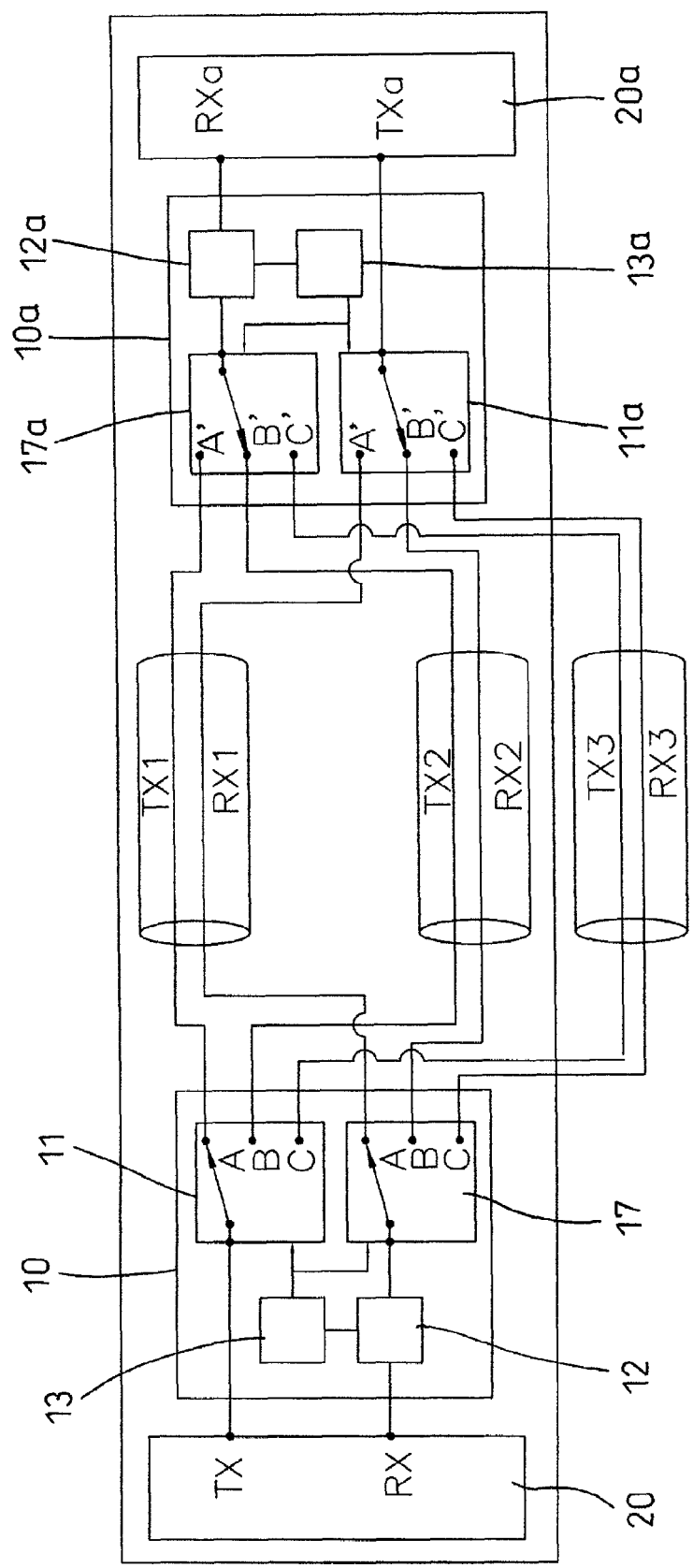
FIG. 4 is a schematic view showing a pair switching device of the present invention is applied to connect with three sets of optical channels.

With reference to FIG. 4, when the first switching device (10) is engaged in the port one position (A) and the second switching device (10a) is in the port two (B') position, the first switching device (10) accordingly fails to detect any optical signals during this time, and it orders the optical switch (11) to step down to the port two (B) position.

At the moment that the first switching device (10) changes the port one (A) to port two (B), since the second switching device (10a) also fails to detect any optical signal, so the second switching device (10a) orders the optical switch (11a) to step down to the port three (C') position.

However the first switching device (10) still does not detect any optical signals and continues to order the optical switch (11) to step down to the port three (C) position. The second switching device (10a) is also not able to detect any optical signals, and thus causes the optical switch to be switched back to the port one (A') position.

As a result, the first and the second switching devices (10, 10a) are locked in an endless cycle trying to "out-run" each other. Since they are unable to align with each other in the process, no communication is established during this period. Also because the first and the second switching devices (10, 10a) each reacts to the communication breakdown at its own pace, especially in the case with more than one spare channel, there will be a timing difference in their reaction, and the pair of switching devices (10, 10a) accordingly will be switched to different port positions. A solution is proposed in the present invention to overcome the out-running phenomenon in order to make the pair of switching devices (10, 10a) stay in step with each other.

Figure 5:
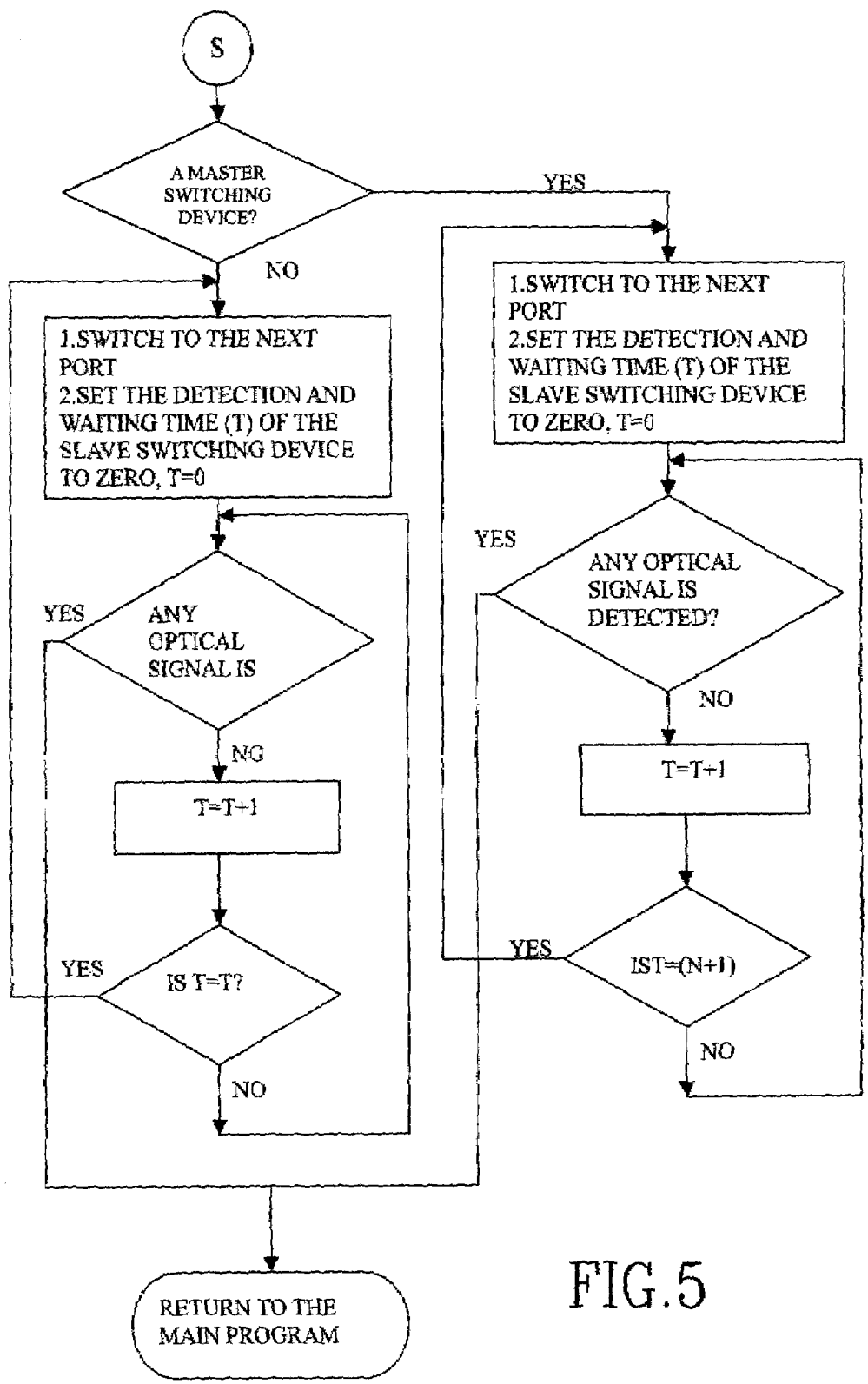
FIG. 5 is an operation flow diagram showing the automatic and synchronous control process of the present invention, including a program to prevent "out-running"
Figure 6A:
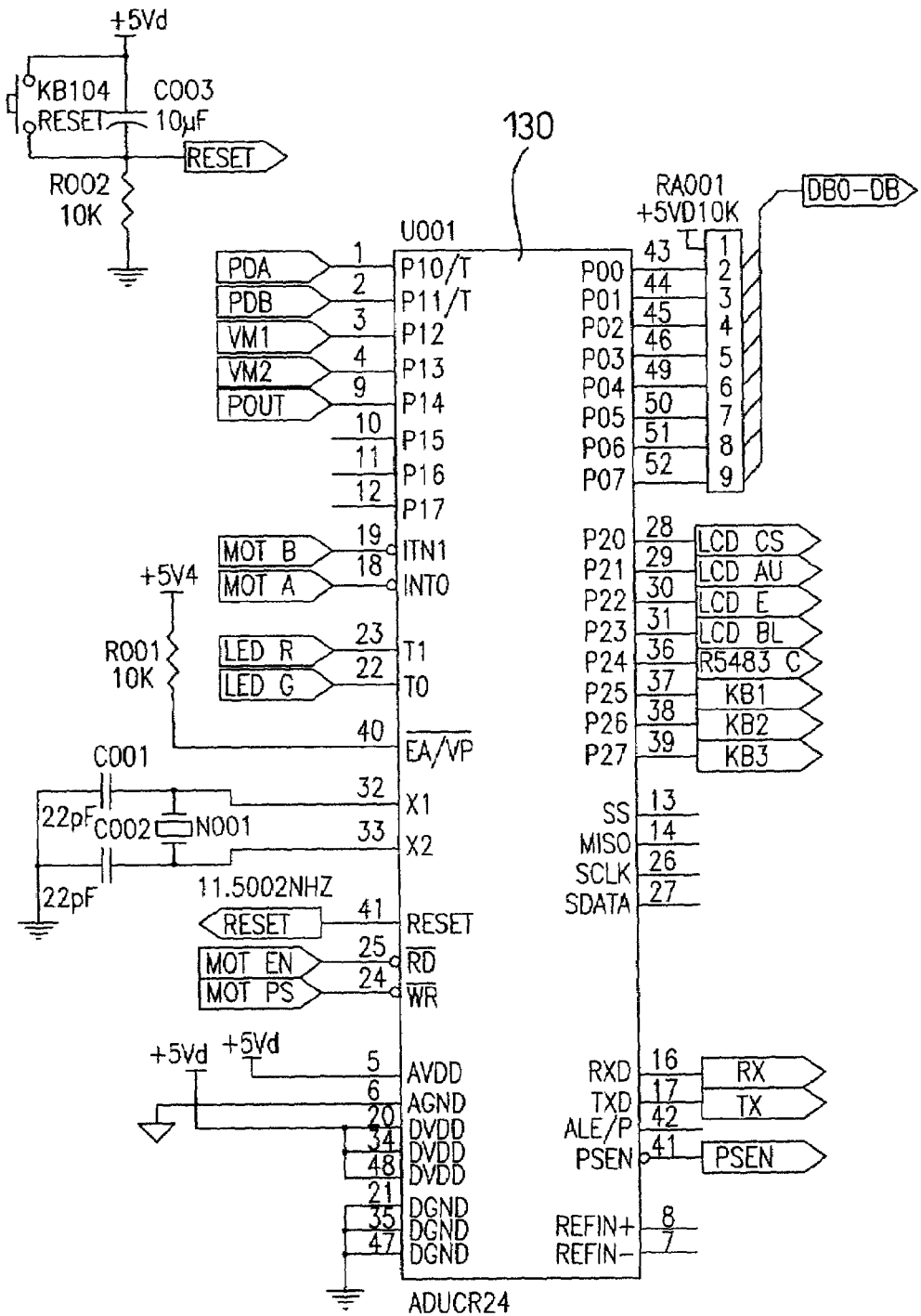
FIGS. 6A–6E are detailed circuit diagrams of the present invention.
Figure 6B:
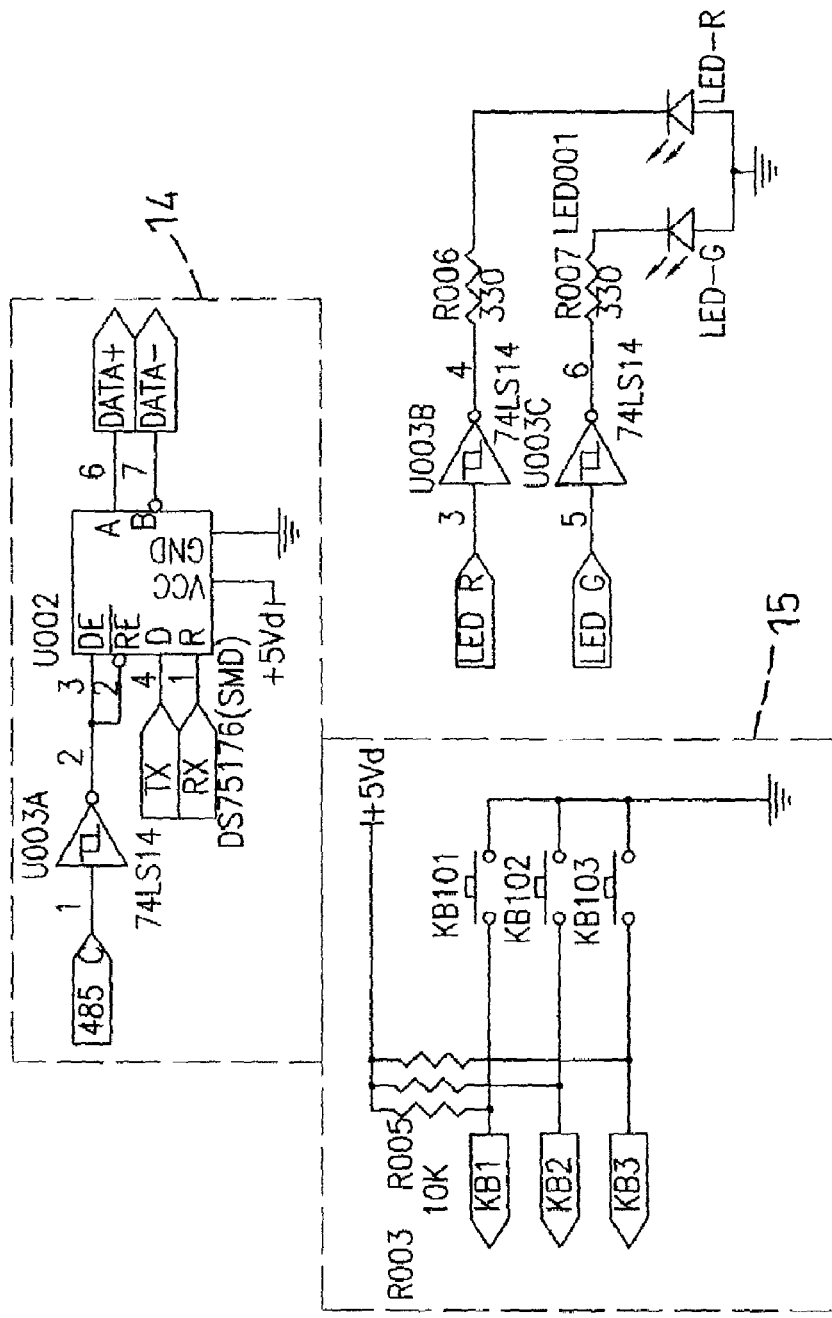
Figure 6C:
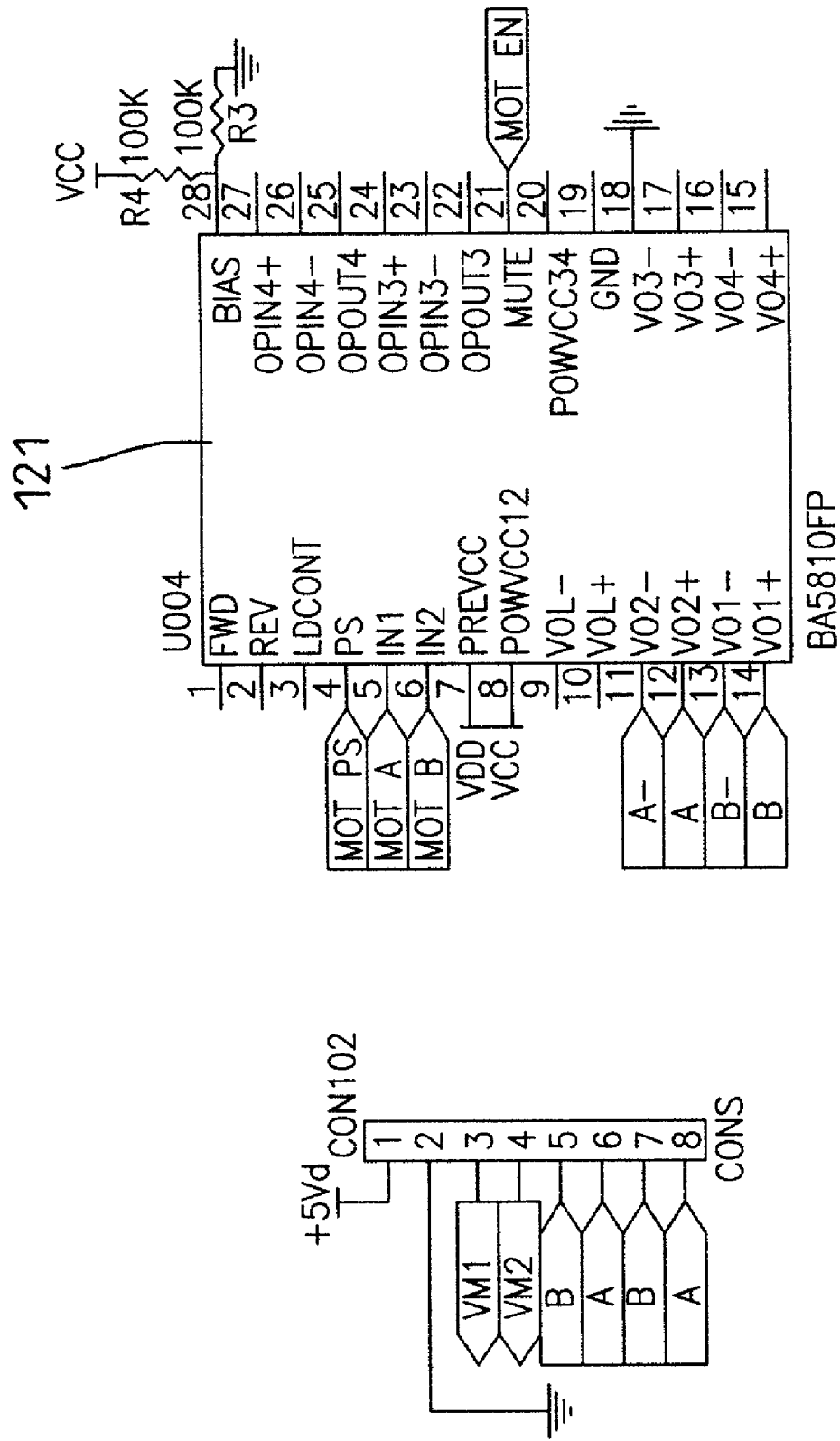
Figure 6D:
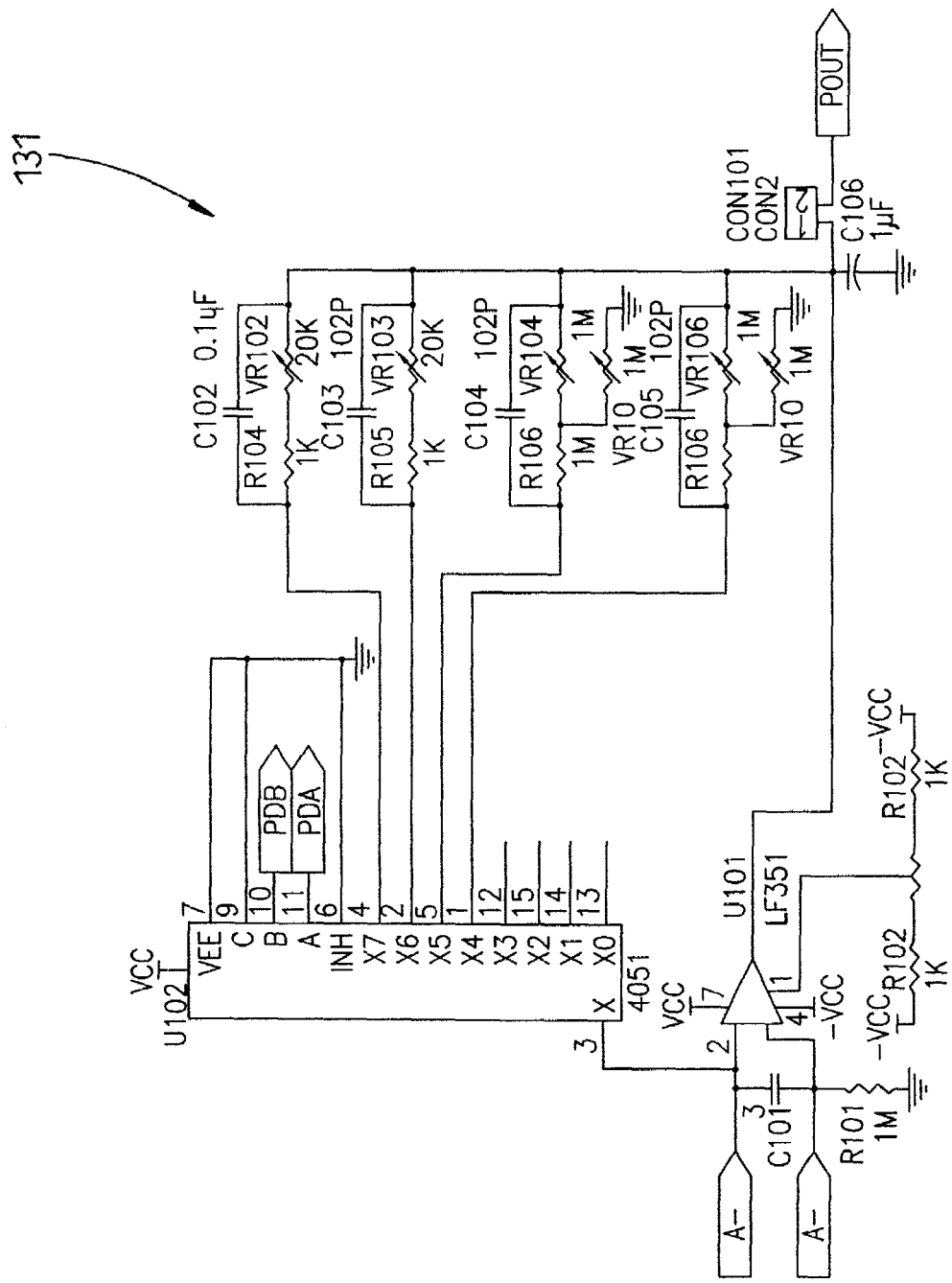
Figure 6E:
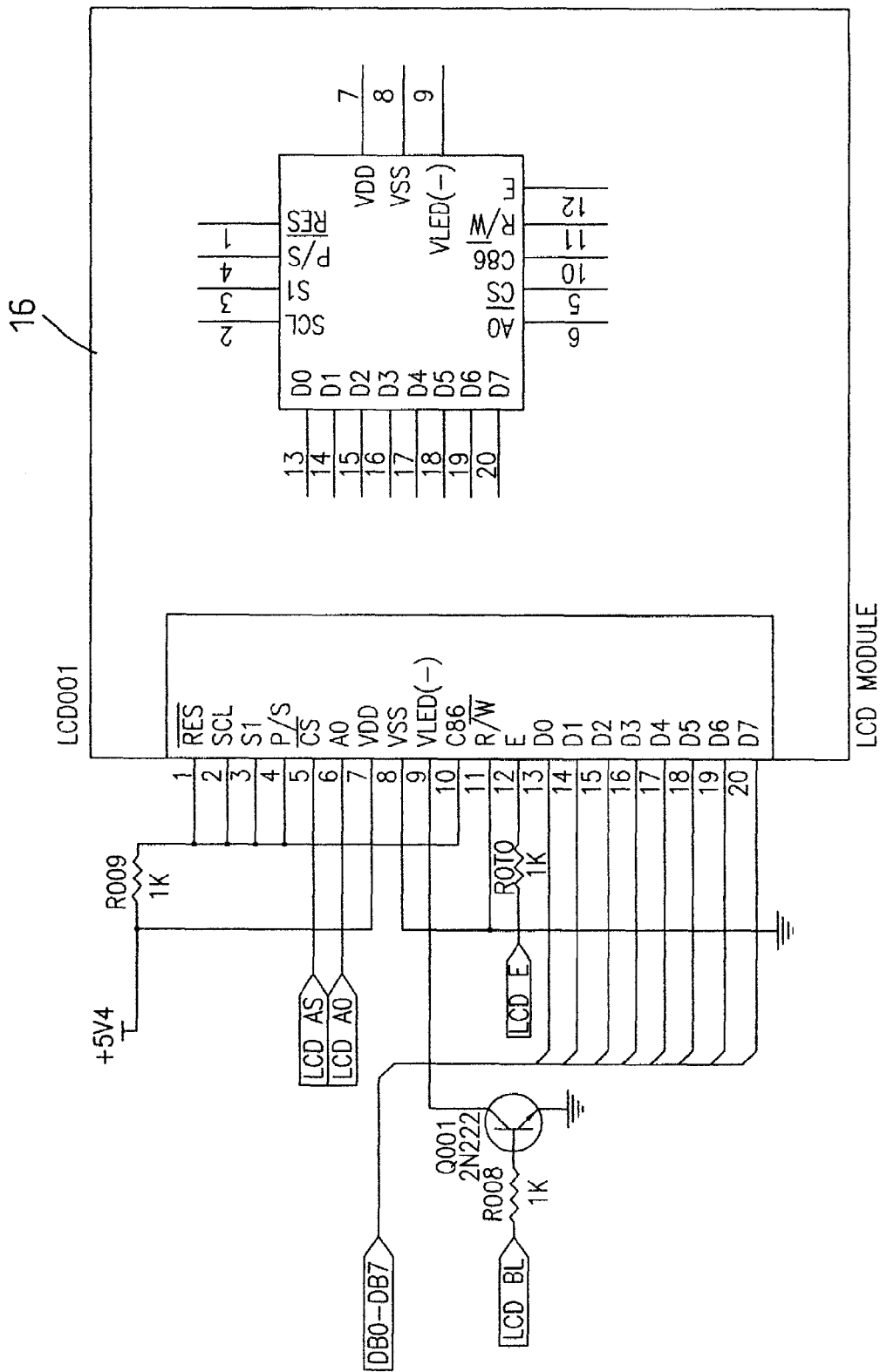
Figure 7:
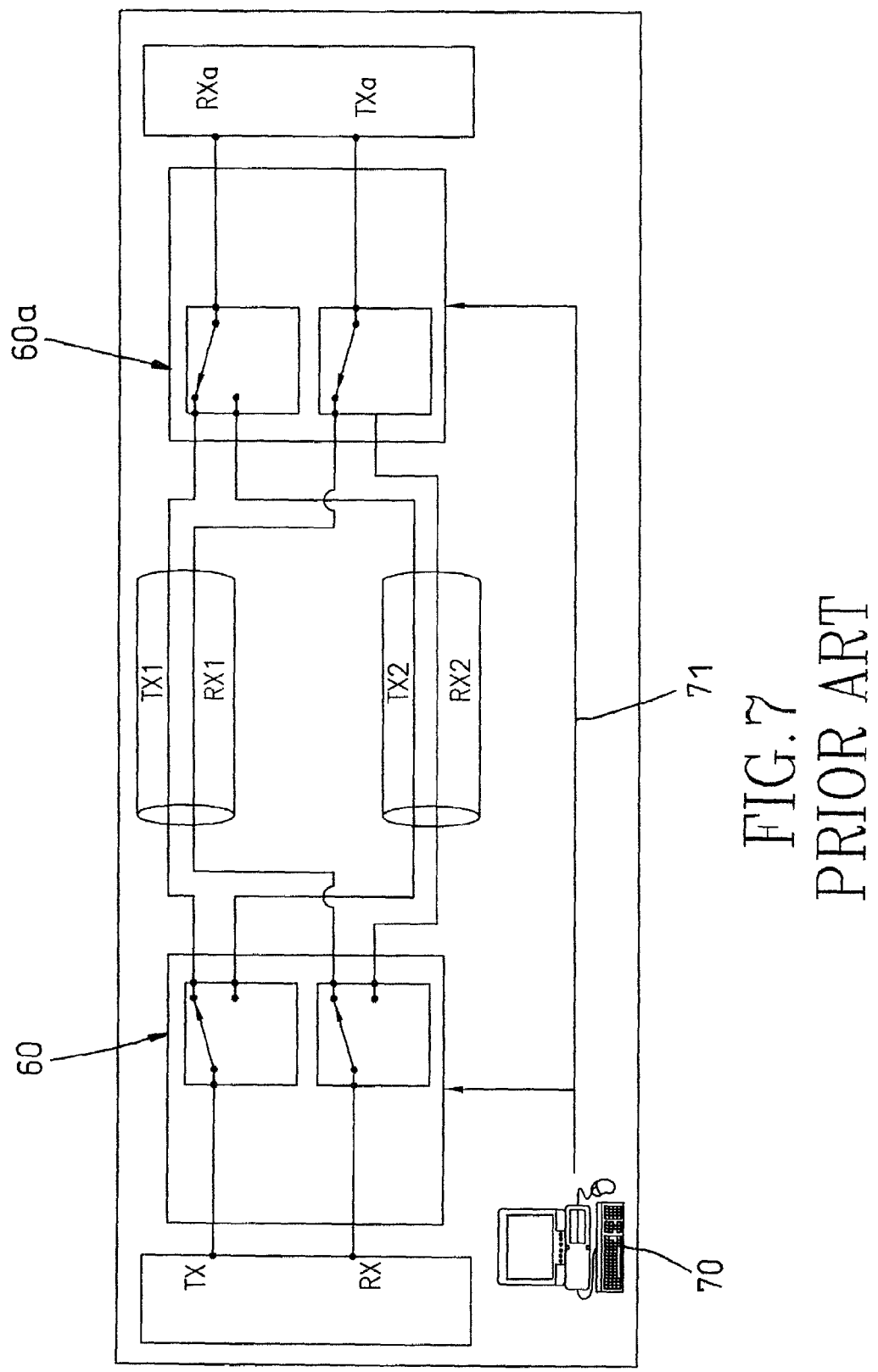
FIG. 7 is a diagrammatic view showing conventional optical switches applied to control the main and spare optical channels.

FIG. 5 depicts an operation flow diagram of the automatic synchronous switching of optical channels under the present invention. Since a slight difference in switching timing exists among the first and the second switching devices (10, 10a), a synchronization process is programmed into the microprocessors (130, 130a) of the switch-controlling circuits (13, 13a), the process in each microprocessor (130, 130a) including the steps of:

setting a base time (T);

detecting a number of optical channels (n) (for example, an optical switch with 3 ports each corresponding to an optical channel, n is 3);

establishing a master-slave relationship between a pair of switching devices (if the first switching device (10) is the master one, then the second switching device (10a) becomes the slave one); and determining whether it is the master switching device (10); if yes, the signal detecting and waiting time (t) of the master switching device (10) is set to be n+1 times the base time (T), which means t=(n+1)T. Otherwise it is a slave switching device (10a) and the signal detecting and waiting time (t') of the slave one is set to be equal to the base time (T), that is t'=T.

The flow chart of the foregoing synchronization process of the present invention is shown in FIG. 5. Since the switching time interval of the master switching device (10) is n+1 times longer than that of the slave switching device (10a), allowing the master switching unit (10) to have an n+1 times longer time to wait for the slave switching device (10a) after each switchover, so as to ensure that the slave switching device (10a) has sufficient time to complete a seek cycle, and only then the master switching device (10) will continue to switch to the next optical channel. Therefore this method is capable of preventing the "out-running" phenomenon from arising during the switching and the optical signal seeking process.

The present invention has found two main applications:

The first application is that it enables the optical receiver to scan automatically for specific signals from a specific transmitter among a plurality of transmitters and to lock in the signal transmission from the specific transmitter.

The second application is that it can perform automatic and synchronous switching between the main and spare optical channels, thus avoiding the problem with manual operation and any additional investment for setting up a controller system or extra communication lines.

What is claimed is:

1. A method for switching optical channels automatically and synchronously, comprising the steps of:

providing a first switching device (10) and a second switching device (10a) respectively connected to a first optical terminal (20) and a second optical terminal (20a), wherein multiple optical channels are connected between the first switching device (10) and the second switching device (10a);

detecting whether any optical signals are transmitting between the first switching device (10) and the second switching device (10a) over a first one of the multiple optical channels or not;

locking one of the multiple optical channels when the optical signals are transmitting between the first switching device (10) and the second switching device (10a); and switching the first switching device (10) to a second one of the multiple optical channels when there is no optical signals transmission over the first one of the multiple optical channels, and then switching the second switching device (10a) to the second one of the multiple optical channels that the first switching device (10) switches to, whereby the first and the second switching devices (10, 10a) are in communication, the switching step including the steps of:

presetting a base period (T);

detecting a number of the multiple optical channels (n) that are connected between the first switching device (10) and the second switching device (10a);

establishing a master-slave relationship between the first and the second switching devices (10, 10a), the first switching device (10) being set as a master switching device and the second switching device (10a) being set as a slave switching device;

setting a first signal detecting and waiting time (t) of the master switching device, where the first signal detecting and waiting time (t) is n+1 times the base period (t=(n+1)×T); and setting a second signal detecting and waiting time (t') of the slave switching device, where the second signal detecting and waiting time (t') is equal to the base period (t'=T);

whereby the master switching device (10) has an n+1 times longer period to wait for the slave switching device (10a) when the master switching device is switched to the second one of the multiple optical channels, thereby ensuring that the slave switching device (10a) has sufficient time to complete a seeking cycle among the multiple optical channels and to the second one of the multiple optical channels so as to communicate with the master switching device.

2. An automatic and synchronous switching device (10) for optical channels, the switching device comprising:

at least two optical switches (11)(17), wherein each optical switch (11)(17) has multiple ports, each of the multiple ports respectively adapted to link to one of optical channels, and each optical switch (11)(17) has a common end adapted to connect to an optical terminal;

a switch-controlling control circuit (13) connected to the at least two optical switches (11)(17);

an optical power meter (12) having an output connected to the switch-controlling circuit (13) for monitoring light signals transmission over the optical channels and intercepting a small amount of the light signals, then passing the small amount of the light signals to the switch-controlling circuit (13); and, a serial interface (14) connected to an output of the switch-controlling circuit (13) for being an interface with electrical equipment, wherein when the optical power meter (12) detects any signal over one of the optical channels, the optical power meter (12) sends a control signal to the switch-controlling circuit (13), whereby the switch-controlling circuit (13) orders the at least two optical switches to be locked to the one of the optical channels until the signal transmission is ended;

wherein the switching device (10) includes a program to perform switching processes when the switching device (10) is linked to a second switching device (10a), the program performing the steps of:

presetting a base period (T);

detecting a number of the multiple optical channels (n) connected between the first switching device (10) and the second switching device (10a);

establishing a master-slave relationship between the first and the second switching devices (10, 10a), the first switching device (10) being set as a master switching device and the second switching device (10a) being set as a slave switching device;

setting a first signal detecting and waiting time (t) of the master switching device, where the first signal detecting and waiting time (t) is n+1 times the base period (t=(n+1)×T); and setting a second signal detecting and waiting time (t') of the slave switching device, where the second signal detecting and waiting time (t') is equal to the base period (t'=T);

whereby the master switching device (10) has an n+1 times longer period to wait for the slave switching device (10a) when the master switching device is switched to the second one of the multiple optical channels, thus ensuring that the slave switching device (10a) has sufficient time to complete a seeking cycle among the multiple optical channels and to switch to the second one of the multiple optical channels so as to communicate with the master switching device.

3. The device as claimed in claim 2, wherein the switch-controlling circuit (13) includes:

a microprocessor (130) having an output connected to the serial interface (14);

an analog/digital converter (131) connected to the microprocessor (130) for converting the small amount of the light signals into a digital signals and passing the digital signals into the microprocessor (130); and a keypad (15) connected to the microprocessor (130) for receiving external control commands.

4. The device as claimed in claim 2, wherein the optical power meter (12) is formed with an optical splitter (120), a PIN diode (122) connected to the optical splitter, and a signal amplifier (121) connected to the PIN diode (122), wherein an output of the signal amplifier (121) is connected to the analog/digital converter (131) of the switch-controlling circuit (13), and the common end of each optical switch is connected to said optical splitter (120).

* * * * *